UNITED STATES PATENT OFFICE.

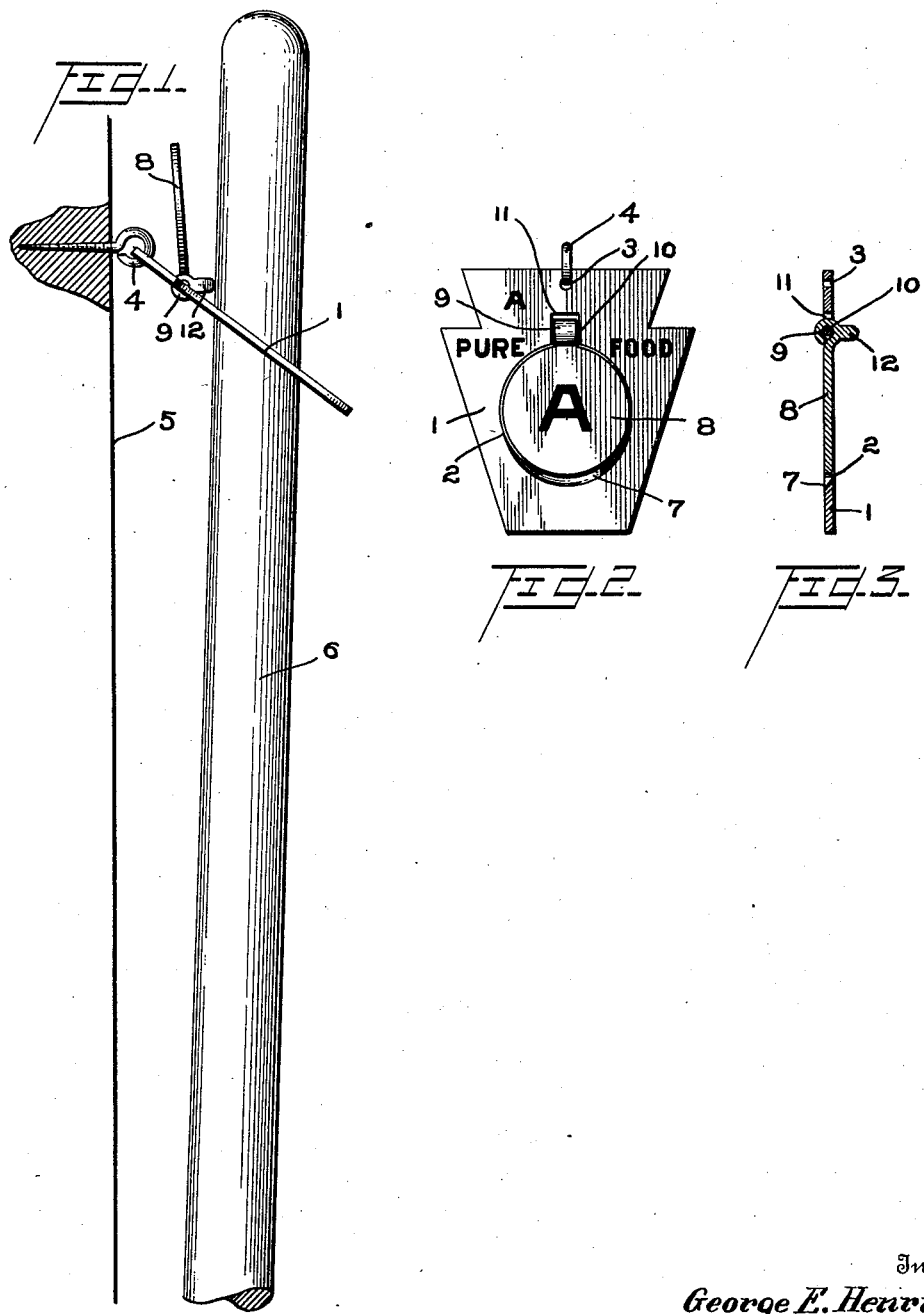

GEORGE E. HENRY, OF PHILADELPHIA, PENNSYLVANIA.

BROOM-HOLDER.

1,087,291.  Specification of Letters Patent.  Patented Feb. 17, 1914.

Application filed March 7, 1913. Serial No. 752,537.

*To all whom it may concern:*

Be it known that I, GEORGE E. HENRY, a citizen of the United States, residing at Philadelphia, in the county of Philadelphia and State of Pennsylvania, have invented certain new and useful Improvements in Broom-Holders, of which the following is a specification.

My invention relates to improvements in broom holders, the object of the invention being to provide an inexpensive ornamental device which may be quickly placed in position, and which will support a broom and permit the latter to be readily placed in position and removed from the device.

A further object is to provide a device of this character which will accommodate itself to various sizes of broom handle, and which readily lends itself to various shapes, so that it may be made to represent trade-marks and various ornamental designs.

With these and other objects in view, the invention consists in certain novel features of construction and combinations and arrangements of parts as will be more fully hereinafter described and pointed out in the claim.

In the accompanying drawings: Figure 1 is a view in side elevation illustrating my improvements in operative position. Fig. 2 is a plan view of the device shown in Fig. 1, and Fig. 3 is a view in longitudinal section.

My improved device comprises a metal plate 1 which may be of any desired shape to illustrate any trade-mark or other ornamental design. In Figs. 1, 2, and 3, this plate is in the form of a keystone. It might be shaped in any desired way, and hence I am not limited in this particular. The plate 1 is provided with an opening 2 which is preferably circular and at one end the plate is provided with a small opening 3 to receive a screw eye 4, the latter adapted to be screwed into a wall or other support 5, and support the plate. The opening 2 is provided in plate 1 to receive a broom handle 6, and the wall of said opening adjacent the free end of the plate 1 is beveled or sharpened as indicated at 7 to more firmly grip the broom handle. A hinged shutter 8 normally closes the opening 2 and is circular to conform to the shape of said opening. This shutter 8 is provided at one end with an eye 9 to receive a pin 10 fixed in plate 1 and extending across a recess 11 in said plate so as to pivotally connect the shutter with the plate.

The eye 9 is provided with an integral crank arm 12 which when the shutter is thrown upward, is projected into the opening 2, and bears against the broom handle as indicated clearly in Fig. 1. By providing this crank arm 12, any ordinary size of broom handle may be accommodated because the arm 12 will accommodate itself to various diameters of brooms and securely clamp any. When no broom is in the device, the latter will hang from the screw eye and act as an advertising device for any line of goods. When the broom handle is inserted through the opening 2, the shutter 8 will be moved upwardly and the weight of the broom will lock itself in the device as will be readily understood.

While I refer to the part 12 as a crank arm, it acts as a cam or eccentric, so that the weight of the broom handle thereon tends only to more firmly bind the handle in the plate.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A broom holder comprising a plate, a screw eye pivotally connected to the plate and adapted to support the same, said plate having a handle-receiving opening therein, a shutter normally closing said opening, said shutter hinged to said plate at one side of the opening, and a crank arm on said shutter at its hinge adapted to bind against a handle when the latter is suspended in the opening in the plate and clamp the handle against the wall of said opening, substantially as described In testimony whereof I have signed my name to this specification in the presence of two subscribing witnesses.

GEORGE E. HENRY.

Witnesses:
R. H. KRENKEL,
CHAS. E. POTTS.

Copies of this patent may be obtained for five cents each, by addressing the "Commissioner of Patents, Washington, D. C."